(12) United States Patent
Mochizuki

(10) Patent No.: US 7,403,317 B2
(45) Date of Patent: Jul. 22, 2008

(54) OPTICAL SCANNING DEVICE AND METHOD OF MANUFACTURING THE SAME

(75) Inventor: Eiji Mochizuki, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 222 days.

(21) Appl. No.: 11/074,785

(22) Filed: Mar. 9, 2005

(65) Prior Publication Data

US 2005/0213230 A1   Sep. 29, 2005

(30) Foreign Application Priority Data

Mar. 10, 2004   (JP)   ............................. 2004-068028

(51) Int. Cl.
   *G02B 26/08*   (2006.01)
(52) U.S. Cl. ..................................... 359/224
(58) Field of Classification Search ......... 359/223–226, 359/871, 196–198, 872
   See application file for complete search history.

(56) References Cited

U.S. PATENT DOCUMENTS

| | | | |
|---|---|---|---|
| 6,271,955 B1 * | 8/2001 | Atobe et al. | ................. 359/291 |
| 6,657,765 B2 | 12/2003 | Hayashi et al. | |
| 2002/0018615 A1 * | 2/2002 | Laor et al. | ..................... 385/18 |
| 2003/0053156 A1 | 3/2003 | Satoh et al. | |
| 2003/0072066 A1 | 4/2003 | Hayashi et al. | |
| 2004/0263937 A1 | 12/2004 | Fujii et al. | |

FOREIGN PATENT DOCUMENTS

| | | |
|---|---|---|
| JP | 8-334722 | 12/1996 |
| JP | 2924200 | 5/1999 |
| JP | 3011144 | 12/1999 |
| JP | 2002-277805 | 9/2002 |
| JP | 2002-277806 | 9/2002 |
| JP | 2002-277807 | 9/2002 |
| JP | 2002-277808 | 9/2002 |
| JP | 2003-66361 | 3/2003 |
| JP | 2003-84226 | 3/2003 |
| JP | 2003-98469 | 4/2003 |
| JP | 2003-107387 | 4/2003 |
| JP | 2004-177487 | 6/2004 |

* cited by examiner

*Primary Examiner*—Euncha P Cherry
(74) *Attorney, Agent, or Firm*—Oblon, Spivak, McClelland, Maier & Neustadt, P.C.

(57) ABSTRACT

An optical scanning device is disclosed that is manufactured through a simple mounting process and is provided with a hermetically sealed oscillation space for an oscillation mirror. The optical scanning device includes plural drive electrodes for driving the oscillation mirror and plural external electrodes of the drive electrodes that are formed at the same height.

23 Claims, 15 Drawing Sheets

S1

OPTICAL SCANNING DEVICE AND METHOD OF MANUFACTURING THE SAME

BACKGROUND OF THE INVENTION

1. Field of the Invention

The present invention relates to an optical scanning device implementing a movable mirror as a deflector for scanning an optical beam and a method of manufacturing such an optical scanning device.

2. Description of the Related Art

Conventionally, a polygon mirror or a galvanometer mirror is used in an optical scanning device as a deflector for scanning an optical beam. In order to achieve a high resolution image and high-speed printing, the rotational speed of the deflector needs to be increased. However, in the prior art, high speed scanning technology is restricted by factors such as the durability of the bearing, heat generation due to windage loss, and noise.

In response to such a problem, in recent years and continuing, technology is being developed for applying silicon micromachining to an optical deflector. For example, Japanese Patent No. 2924200 and Japanese Patent No. 3022244 disclose technology pertaining to integrally forming an oscillation mirror and a torsion beam bearing the oscillation mirror on a silicon substrate.

Also, Japanese Patent No. 2924200 discloses a technique for hermetically sealing an oscillation space of an oscillation mirror. According to such a technique, a structure that is processed in depressurized inert gas is hermetically sealed, as is illustrated in FIGS. 1A and 1B.

Also, Japanese Laid-Open Patent Publication No. 8-334722 discloses a technique for hermetically sealing a space with a glass plate through anodic bonding to provide a vacuum space for an electromagnetic power driven oscillation mirror as is illustrated in FIG. 2.

According to the technique of integrally forming an oscillation mirror and a torsion beam bearing the oscillation mirror on a silicon substrate, resonance is used to induce back-and-forth oscillation so that high speed operation may be realized without increasing the noise level. Also, according to this technique, the required drive power for rotating the oscillation mirror is relatively low so that power consumption may be maintained at a low rate.

When an oscillation mirror as is described above is used in an air medium, the following problems arise.

(1) Operational characteristics are influenced by external environmental factors such as temperature, humidity and dust so that reliability is decreased.

(2) A large scanning angle cannot be obtained due to the viscous resistance of air.

Thereby, it is desired that at least the oscillation space of the oscillation mirror be hermetically sealed.

According to the disclosure of Japanese Patent No. 2924200, a single structure is provided on a stem, and a cap is provided over the top portion of the structure to seal the structure. However, complicated processing needs to be conducted using a relatively large number of components including the stem and the cap to realize the above disclosed device structure, and thereby, the manufacturing process for the device structure is quite complicated.

Also, the device structure disclosed in Japanese Laid-Open Patent Publication No. 8-334722 uses an electromagnetic power driven oscillation mirror, and thereby, its manufacturing procedure requires a relatively large number of processes using a relatively large number of components. Also, it is noted that such a device uses a large number of glass plates so that its manufacturing cost may be increased. Further, Japanese Laid-Open Patent Publication No. 8-334722 does not mention mounting the oscillation mirror structure on a printed circuit board with a drive circuit.

SUMMARY OF THE INVENTION

Accordingly, it is an object of the present invention to provide a sealed optical scanning device mounted on a printed circuit board that is small in size and is easily and inexpensively manufactured without requiring a large number of components and complicated mounting procedures.

It is another object of the present invention to facilitate connecting electrodes from a sealed space of the sealed optical scanning device to the outside while maintaining the sealed state of the optical scanning device.

It is another object of the present invention to provide an optical scanning device that is capable of obtaining a large scanning angle by providing a counter mirror facing against the oscillation mirror so that an optical beam is reflected back and forth between the two mirrors.

According to an aspect of the present invention, an optical scanning device is provided that includes:

a plurality of drive electrodes for driving an oscillation mirror, the drive electrodes being arranged in perpendicular and parallel directions with respect to a torsion rotational axis; and a plurality of external electrodes of the drive electrodes that are formed at a same height.

According to a preferred embodiment of the present invention, the external electrodes of the drive electrodes are formed on a same side.

According to a preferred embodiment of the present invention, the external terminals are integrally formed on a side of a substrate of the oscillation mirror against which side a base substrate including a lead terminal is positioned.

According to a preferred embodiment, the optical scanning device of the present invention further includes:

conduction holes formed around the external electrodes, the conduction holes being used to realize conduction between the external electrodes and the drive electrodes in a case where the external electrodes are formed at an opposite side of the drive electrodes.

According to a preferred embodiment of the present invention, the external electrodes are substantially equivalent in size and are arranged to be substantially symmetrical with respect to the center of a substrate of the oscillation mirror.

According to a preferred embodiment of the present invention, the substrate of the oscillation mirror includes a conductor that functions as the drive electrodes of the oscillation mirror.

According to a preferred embodiment of the present invention, the external electrodes of the drive electrodes are formed on the substrate of the oscillation mirror, and the external electrodes are spatially isolated by slit trenches formed at the substrate, the slit trenches connecting to an oscillation space of the oscillation mirror.

According to a preferred embodiment of the present invention, the oscillation space of the oscillation mirror is hermetically sealed.

According to a preferred embodiment, the optical mirror device of the present invention further includes:

a counter mirror that is positioned against the oscillation mirror and spaced apart from the oscillation mirror by an oscillation space of the oscillation mirror;

wherein an optical beam is reflected between the oscillation mirror and the counter mirror.

According to a preferred embodiment of the present invention, the counter mirror is integrally formed on a substrate that is used to hermetically seal the oscillation space.

According to a preferred embodiment of the present invention, the substrate of the counter mirror is directly connected to a substrate of the oscillation mirror.

According to a preferred embodiment of the present invention, the substrate of the oscillation mirror includes one or more positioning indicators for adjusting the positioning between the oscillation mirror and the counter mirror.

According to another aspect of the present invention, an optical scanning apparatus is provided that includes:

an optical scanning device of the present invention; and a drive voltage generating device that generates a voltage of a predetermined frequency and applies the generated voltage to the optical scanning device to drive the oscillation mirror, the predetermined frequency corresponding to a frequency band in the vicinity of a resonance frequency of the oscillation mirror and outside a peak range of the resonance frequency.

According to another aspect of the present invention, an imaging apparatus is provided that includes:

an optical scanning device of the present invention;

a photoconductor on which an electrostatic image is formed by the optical scanning device;

a developing unit that develops a toner image based on the electrostatic image; and a transfer unit that transfers the toner image onto a recording medium.

According to another aspect of the present invention, a method of manufacturing an optical scanning device of the present invention is provided that includes a step of:

forming a plurality of external electrodes of a plurality of drive electrodes of the oscillation mirror at a same height.

DESCRIPTION OF THE PREFERRED EMBODIMENTS

In the following, preferred embodiments of the present invention are described with reference to the accompanying drawings.

It is noted that in the embodiments described below, an electrostatic power driven micro mirror is used as an oscillation mirror; however the present invention is not limited to such an embodiment and other types of oscillation mirrors may be used as well.

(Manufacturing Method)

FIGS. 3A~3H are diagrams illustrating process steps for manufacturing an optical scanning device in which plural electrodes are aligned in parallel and perpendicular directions. According to the present embodiment, a micro mirror is formed using a SOI (silicon on insulator) substrate. For example, substrates (conductors) with low resistance are used as the substrates of the two sides of the SOI substrate, and an etching process is conducted to form an oscillation space of the oscillation mirror on a thicker one of the substrates and the oscillation mirror on the thinner (e.g., around 60 µm) one of the substrates. According to the present example, since low-resistance substrates (conductors) are used, the substrates themselves may function as electrodes so that metal does not necessarily have to be used to form the electrodes. At each of the substrates, electrodes formed into comb-shaped structures are positioned against comb-shaped electrodes formed at the oscillation mirror. It is noted that by arranging the electrodes into comb-shaped structures, the drive voltage for driving the oscillation mirror may be reduced. According to the present example, electrodes are formed at two levels with respect to the torsion rotation axis direction so that a drive torque may be applied to the oscillation mirror on a constant basis to thereby enlarge the oscillation angle. Also, it is noted that slit trenches and gaps are formed for isolating the plural electrodes with respect to each other and a rib pattern is formed for reducing the weight of the micro mirror while securing its rigidity at the same time.

Figure 1A:
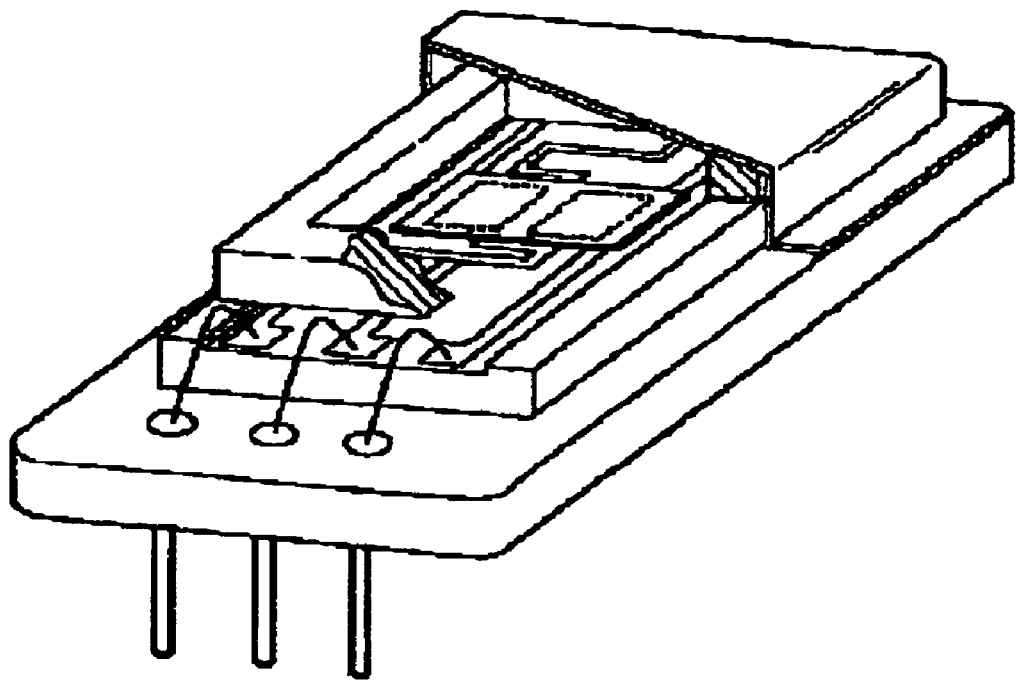
FIGS. 1A and 1B are diagrams showing an exemplary configuration of a micro mirror according to the prior art.
Figure 1B:
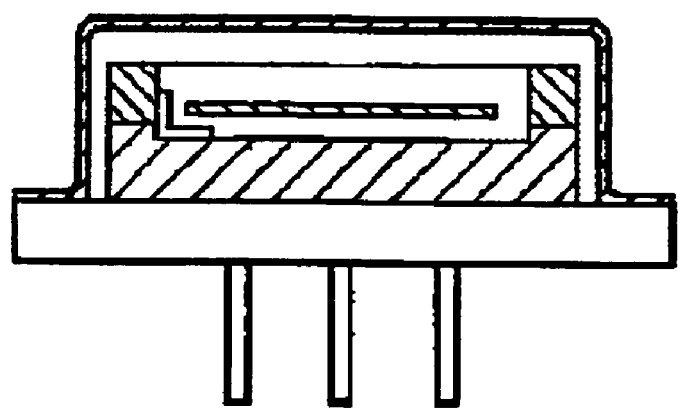
Figure 2:
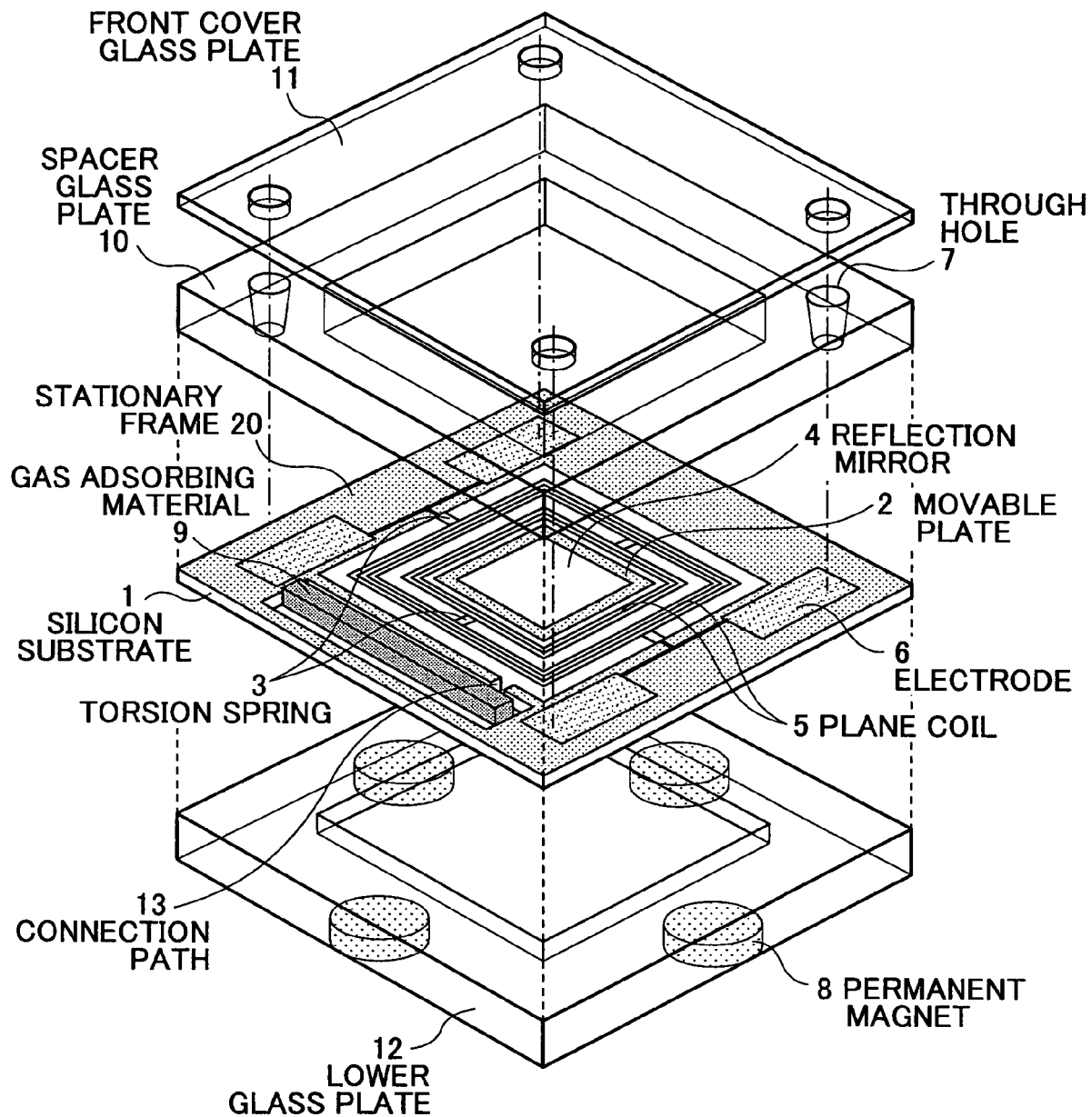
FIG. 2 is a diagram showing another exemplary configuration of a micro mirror according to the prior art.
Figure 3A:
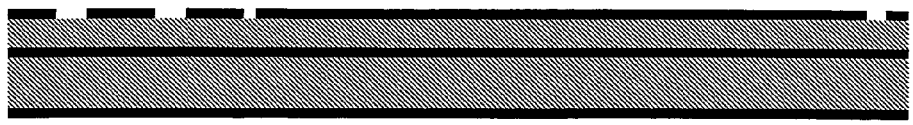
FIGS. 3A~3H are diagrams illustrating process steps for manufacturing a micro mirror according to an embodiment of the present invention.
Figure 3B:
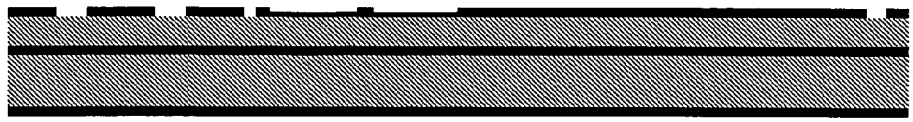
Figure 3C:
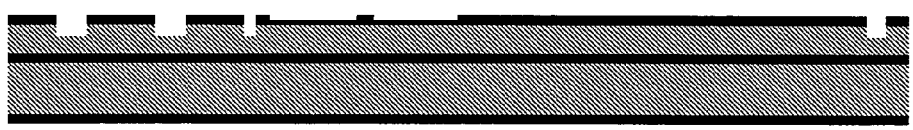
Figure 3D:
Figure 3E:
Figure 3F:
Figure 3G:
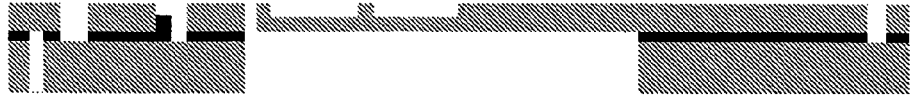
Figure 3H:

In the illustrated example, external electrodes of the electrodes formed on the same side as the oscillation mirror, and external electrodes of the electrodes formed on the opposite side of the oscillation mirror are both formed at an upper side as is shown in FIG. 3H. It is noted that the external electrodes of the electrodes on the opposite side are formed by leaving portions of the substrate on the oscillation mirror side as isolated regions. The conductivity between the electrodes on the other side and the external electrodes may be realized by applying a conductive material.

According to such an arrangement, when plural electrodes are formed along a perpendicular direction with respect to the torsion rotation axis direction, external electrodes may be formed in the same direction and at the same level so that a highly reliable mounting process including a sealing process may be easily conducted as is described below.

Referring to FIGS. 3A~3H, in FIG. 3A, a patterning process is conducted on a $SiO_2$ layer to form slit trench and gap through hole patterns. In FIG. 3B, a patterning process is conducted on the $SiO_2$ layer to form a rib pattern. In FIG. 3C, a first Si layer etching process is conducted. In FIG. 3D, an etching process is conducted on the $SiO_2$ layer, and a second Si layer etching process is conducted to form the slit trenches, gap through holes and ribs. In FIG. 3E, a patterning process is conducted on a $SiO_2$ layer on the other side to form oscillation space and slit trench patterns. In FIG. 3F, a third Si layer etching process and a resist removal process are conducted. In FIG. 3G, a $SiO_2$ removal process and a conductive material formation process are conducted. In FIG. 3H, metal electrodes and the mirror are formed.

(Micro Mirror Structure)

Figure 4A:
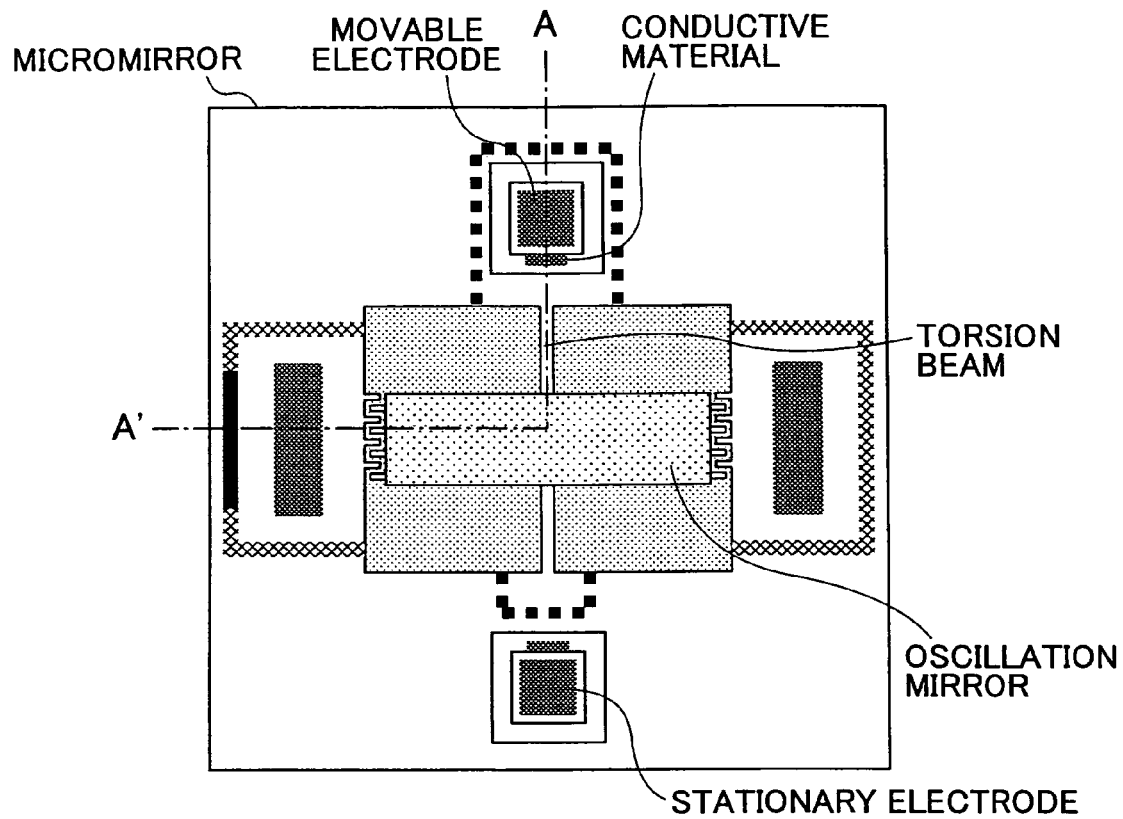
FIGS. 4A~4C are diagrams showing an exemplary configuration of a micro mirror according to an embodiment of the present invention.
Figure 4B:
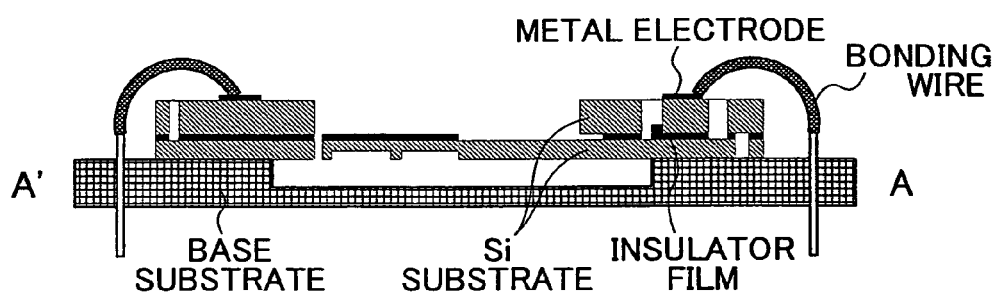
Figure 4C:
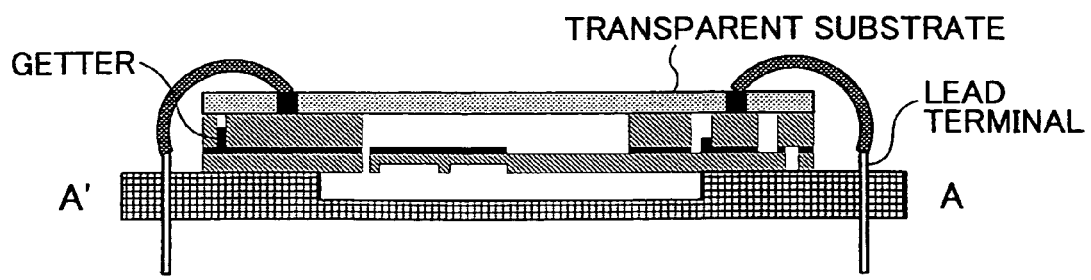

FIGS. 4A~4C are diagrams showing an exemplary structure of a micro mirror that is formed by the processes illustrated in FIGS. 3A~3H. FIG. 4A shows a plan view of the micro mirror. FIG. 4B shows a cross-sectional view of the micro mirror being connected to a base substrate having lead terminals. It is noted that external electrodes of the micro mirror are positioned in the same direction and at the same height so that mounting processes such as wire bonding may be easily conducted. FIG. 4C is a cross-sectional view of the micro mirror being connected to a transparent substrate to be hermetically sealed. It is noted that optical beams are incident to and emitted from the transparent substrate, which is connected to a movable electrode and a stationary electrode of the micro mirror. It is also noted that through holes are formed at the transparent substrate so that the holes may be filled with metal material to realize connection with the lead terminals via bonding wires.

In the arrangement described above, the micro mirror is sealed by the base substrate at its lower side and the transparent substrate at its upper side. In this way, a hermetic seal of the micro mirror may be realized by a simple structure with a small number of components. Also, at the connection between the upper side of the micro mirror and the transparent substrate, the connection surface is sealed by the movable electrode and the stationary electrode and a portion of the connection region is exposed so that electric connection with the external side may be realize. In this way, electrodes may be easily taken outside while maintaining the sealed state of the structure. By arranging the external electrodes to be positioned in the same direction and at the same height, a highly reliable sealed structure and mounting process may be realized. Also, the connection between the respective substrates may be realized according to the substrate material through soldering, glass connection, or epoxy bonding, for example.

Figure 5A:
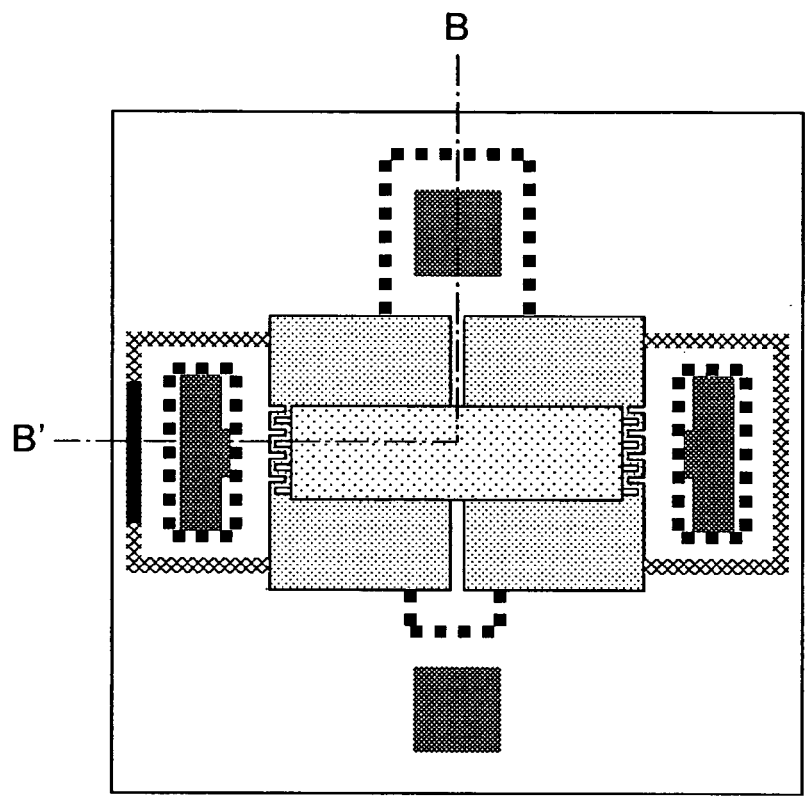
FIGS. 5A~5C are diagrams showing another exemplary configuration of a micro mirror according to an embodiment of the present invention.
Figure 5B:
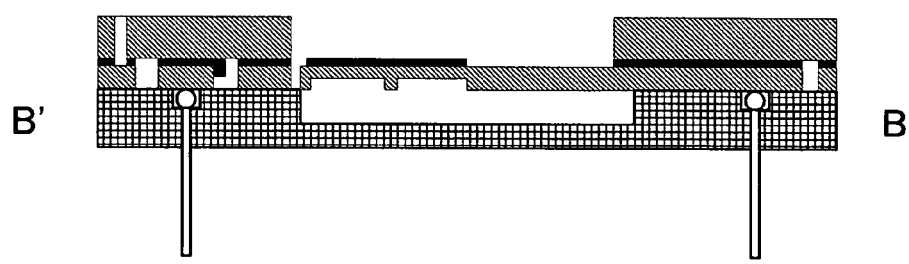
Figure 5C:
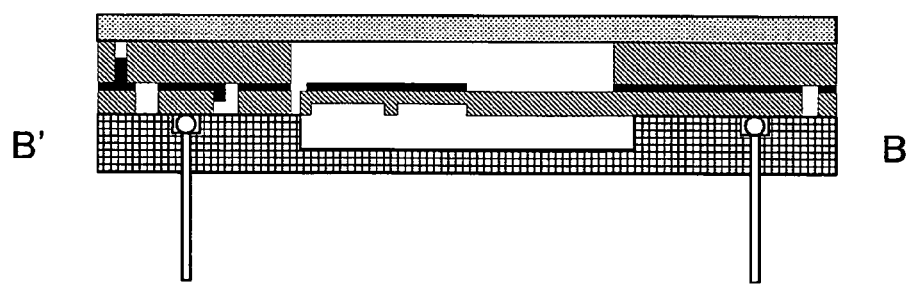

FIGS. 5A~5C are diagrams showing another exemplary structure of a micro mirror in which external electrodes are formed at the opposite side with respect to the electrodes of the micro mirror shown in FIGS. 4A~4C. It is noted that FIG. 5A is a plan view and FIGS. 5B and 5C are cross-sectional views corresponding to FIGS. 4A~4C, respectively. According to the present example, the external electrodes are formed at the base substrate side, and lead terminals are connected with solder balls, for example, as is shown in FIGS. 5B and 5C. The present example also realizes a hermetic seal with a simple structure and a small number of components. Also, since connection through wire bonding is not conducted in the present example, the number of mounting processes may be reduced and miniaturization of the structure may be realized.

Figure 6A:
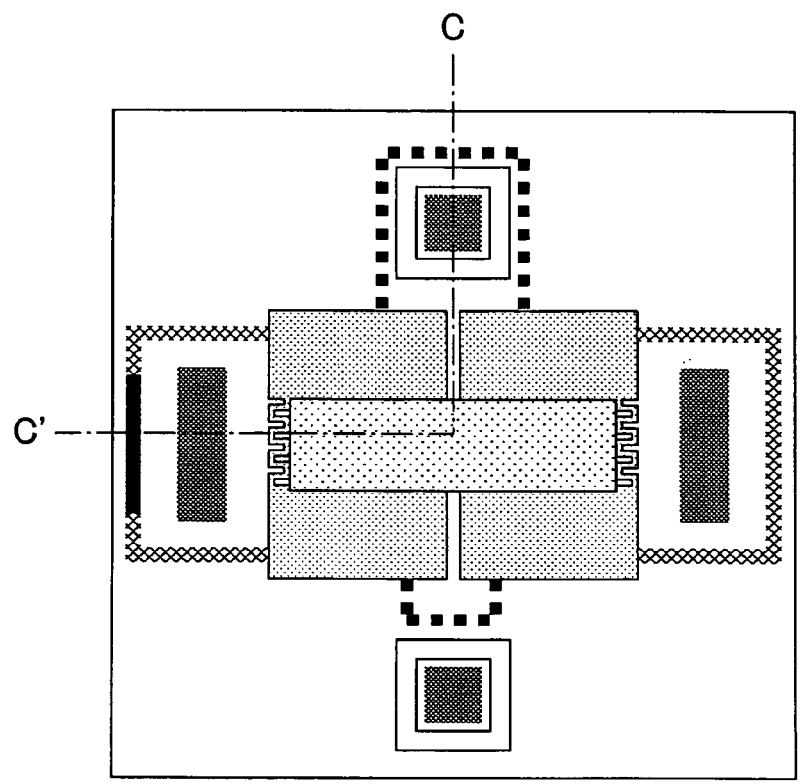
FIGS. 6A~6C are diagrams showing another exemplary configuration of a micro mirror according to an embodiment of the present invention.
Figure 6B:
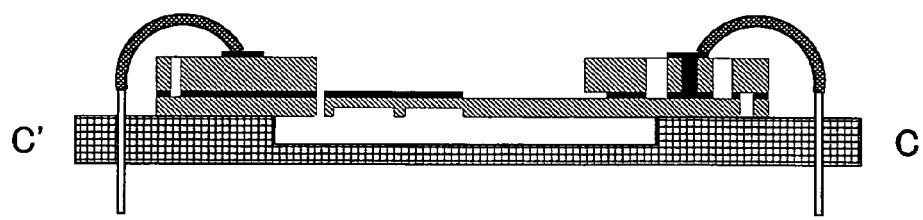
Figure 6C:
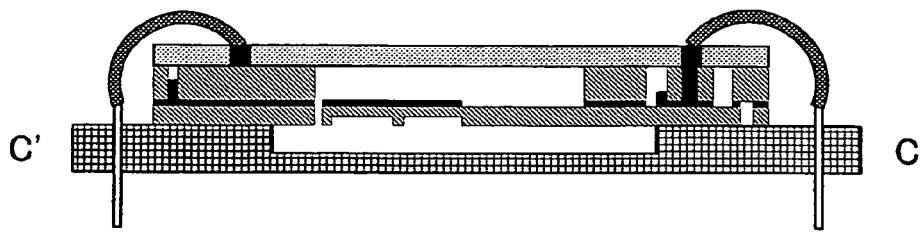

FIGS. 6A~6C show another exemplary structure of a micro mirror in which external electrodes are arranged on the opposite side of drive electrodes. In the examples illustrated in FIGS. 4A~4C and FIGS. 5A~5C, the external terminals are arranged into isolated sections and conduction with the drive electrodes are realized by applying a conductive material on outer periphery portions of the external electrodes. However, in such an arrangement, the external electrodes may be shorted with adjacent electrodes on the same plane. Accordingly, in the example illustrated in FIGS. 6A~6C, conduction holes surrounded by external walls are formed at the external electrodes, and conduction between the drive electrodes is realized by applying a conductive material to the conduction holes. In this way, the problem with regard to shorting with adjacent electrodes may be resolved.

Also, it is noted that in the examples of FIGS. 4A~4C, FIGS. 5A~5C, and FIGS. 6A~6C, getters (gas adsorbing material) are arranged at slit trenches to realize isolation of the SOI substrate. Since the slit trenches are arranged to be connected to the sealed space, a desired vacuum/hermetic seal may be realized by providing the getters at the slit trenches.

Figure 7A:
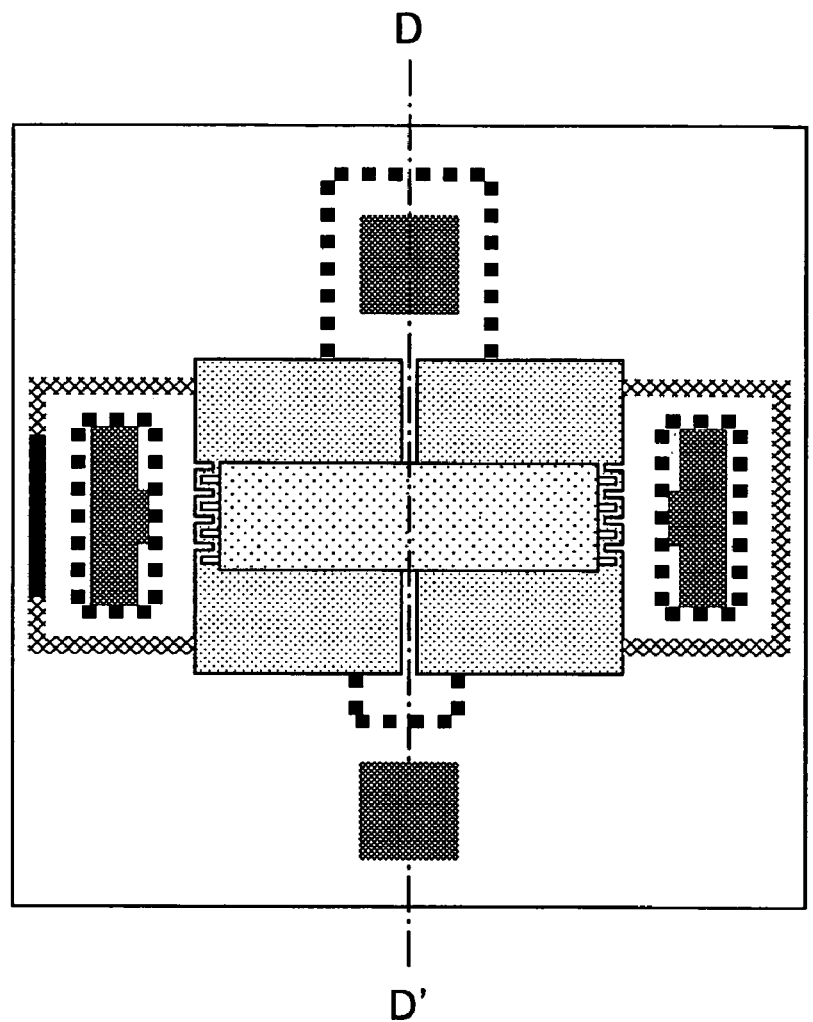
FIGS. 7A and 7B are diagrams showing another exemplary configuration of a micro mirror according to an embodiment of the present invention.
Figure 7B:
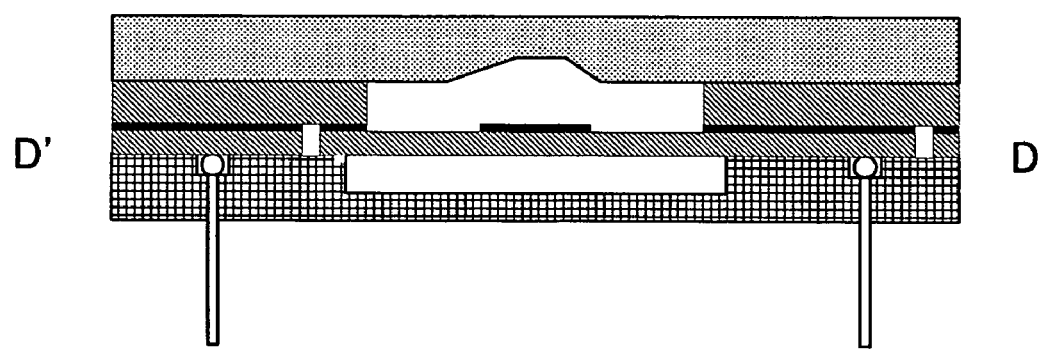

FIGS. 7A and 7B are diagrams showing an exemplary configuration of a micro mirror structure implementing the same SOI substrate as that used in the example of FIGS. 5A~5C in which structure a counter mirror is provided opposite the oscillation mirror so that an optical beam may be reflected back and forth between the oscillation mirror and the counter mirror. In this example, the counter mirror is integrally formed on the transparent substrate and the transparent substrate is directly connected to the SOI substrate. By providing the counter mirror in the manner described above, the scanning angle of the optical beam may be increased. In the previously described examples, the order of connecting the transparent substrate, the micro mirror and the base substrate is not particularly specified. However, in the present example, the transparent substrate with the counter mirror integrally formed thereon is preferably connected to the micro mirror before connecting the base substrate. Since an optical beam is reflected back and forth between the micro mirror and the counter mirror, it is desired that the relative positioning between the two mirrors be accurately set. Also, it is noted that position setting means for arranging the micro mirror and the counter mirror into alignment is preferably provided at the micro mirror side. In this way, the positioning between the oscillation mirror and the counter mirror may be accurately set, and optical characteristics of the structure may be improved.

(Optical Scanning Module and Laser Printer)

In the following, operations of an optical scanning module formed in the above manner and a structure of a laser printer implementing such an optical scanner module are described.

Figure 8:
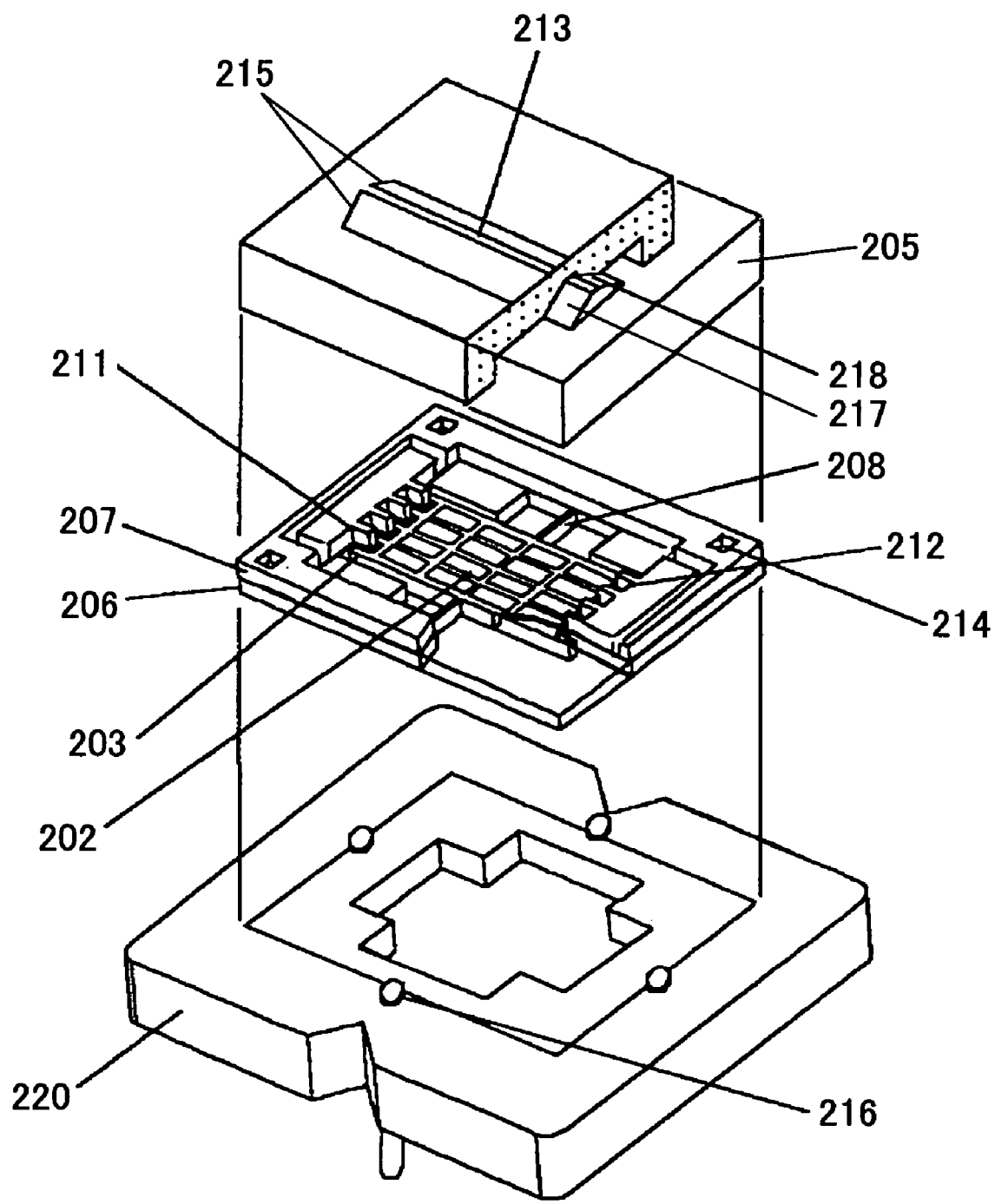
FIG. 8 is a perspective view of a micro mirror module according to an embodiment of the present invention.
Figure 9:
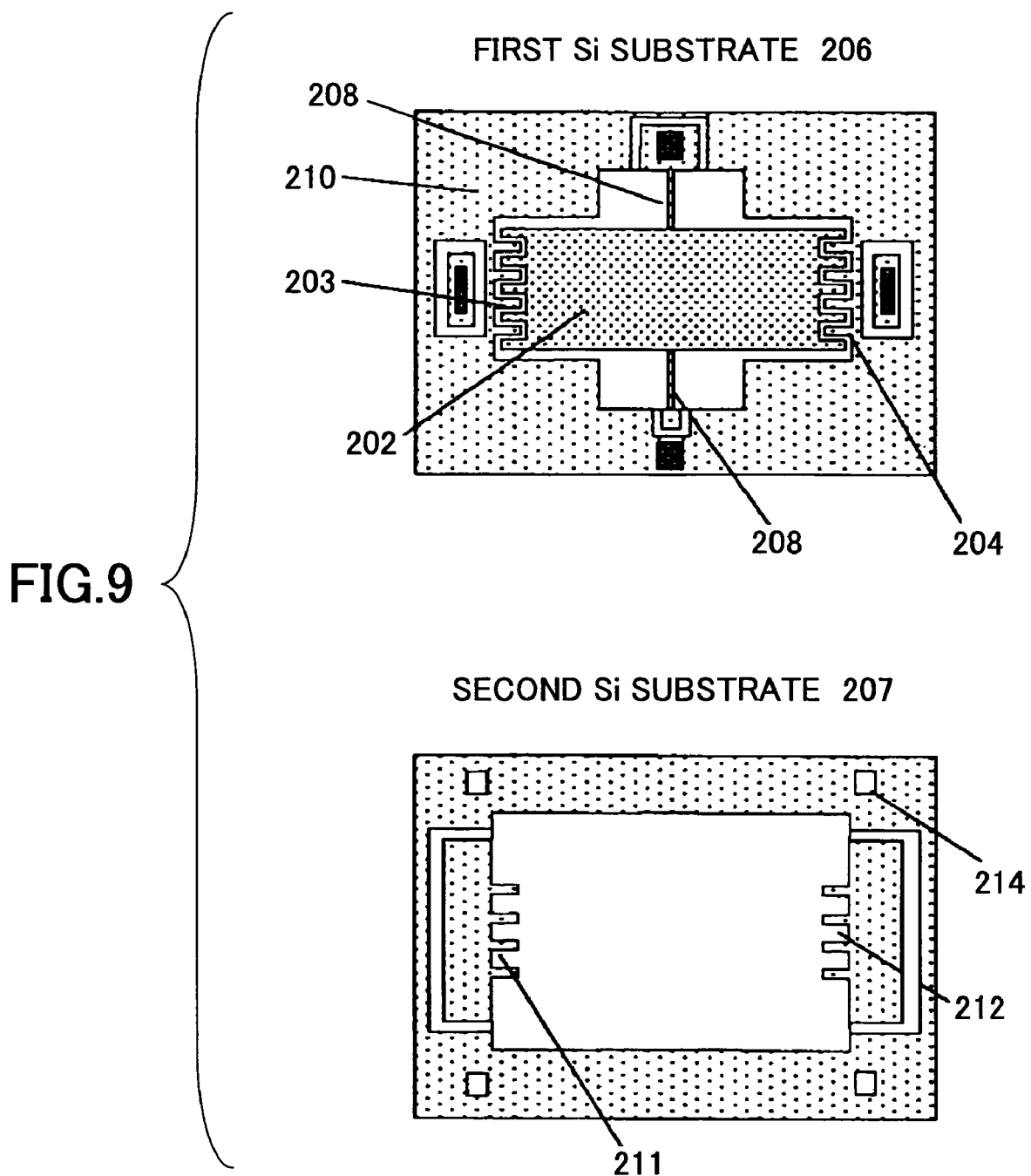
FIG. 9 is a diagram showing configurations of first and second Si substrates of the micro mirror module of FIG. 8.

FIGS. 8 and 9 are diagrams showing a detailed structure of an oscillation mirror module used in an optical scanning apparatus according to an embodiment of the present invention.

In the illustrated example, an oscillation mirror substrate includes two Si substrates 206 and 207 that are connected by an insulator film such as an oxide film. The first Si substrate 206 has a film thickness of approximately 60 µm. A movable mirror 202 and a torsion beam 208 bearing the movable mirror 202 are formed through etching on the first Si substrate 206 within a region isolated from a stationary frame 210.

The movable mirror 202 is arranged to be symmetrical with respect to the torsion beam 208. The side edges of the movable mirror 202 and inner side edges of the stationary frame 210 facing against the side edges of the movable mirror 210 are arranged into engaging comb-shaped structures with a gap of a few μm provided in between the movable mirror edges and the stationary frame edges. It is noted that a metal film such as Au is deposited on the surface of the movable mirror 202 to form a reflecting surface. By connecting the first and second Si substrates 206 and 207 together via an insulator layer and forming an isolated region on the first Si substrate 206 as is shown in FIG. 9, the Si substrate 206 itself is formed into an electrode. In the present example, the concavo-convex portions at the side edges of the movable mirror 202 are denoted as first and second movable electrodes (the first and the second movable electrodes both having the same potential), and the corresponding concavo-convex portions of the stationary frame 210 are denoted as first and second stationary electrodes 203 and 204 (the first and second stationary electrodes 203 and 204 having the same potential).

The second Si substrate 207 has a film thickness of approximately 140 μm. An opening is formed at the center portion of the second Si substrate through etching, and at the inner side edges of the opening, comb-shaped (concavo-convex) structures corresponding to the comb-shaped structures of the stationary frame 210 are formed. The concavo-convex portions formed at the second Si substrate 207 are denoted as third and fourth stationary electrodes 211 and 212. The third and fourth stationary electrodes 211 212 are arranged to be in engagement with the first and second movable electrodes, respectively, so that the first and second movable electrodes may pass through (between) the third and fourth stationary electrodes upon oscillation of the movable mirror 202.

In the present example, voltage pulses with the same phase are applied to the first and second stationary electrodes 203 and 204, a voltage pulse with a phase that is shifted forward with respect to the phase of the voltage pulse applied to the first and second stationary electrodes 203 and 204 is applied to the third stationary electrode 211, and a voltage pulse with a phase that is delayed with respect to the phase of the voltage pulse applied to the first and second stationary electrodes 203 and 204 is applied to the fourth stationary electrode 212.

A base substrate 220 includes lead terminals 216 for realizing electrical connection with a circuit substrate.

A cover 205 has two counter mirrors 215 integrally formed at its inner side and extending in a direction perpendicular to the torsion beam 208 of the first substrate 206. The two counter mirrors 215 are arranged to form an angle of 144.7 degrees, and a slit window 213 provided between the two counter mirrors 215. The two counter mirrors 215 are tilted by 9 degrees and 26.3 degrees, respectively, with respect to the upper substrate surface of the cover 205, and metal films are deposited on the tilted surfaces to form reflection surfaces 217 and 218.

The bottom surface of the cover 205 is arranged to be parallel with the surface of the movable mirror 202, and comes into contact with an upper surface of a frame portion 212 of the second Si substrate 207. In the present example, marks are formed through etching on the side edges of the second Si substrate 207 for indicating a suitable positioning of the counter mirrors 215. Thus, edges of the counter mirror substrate (cover) 205 may be aligned with the marks formed at the edges of the second Si substrate 207 to thereby realize accurate adjustment of counter mirrors 215 with respect to the main scanning direction.

Figure 10:
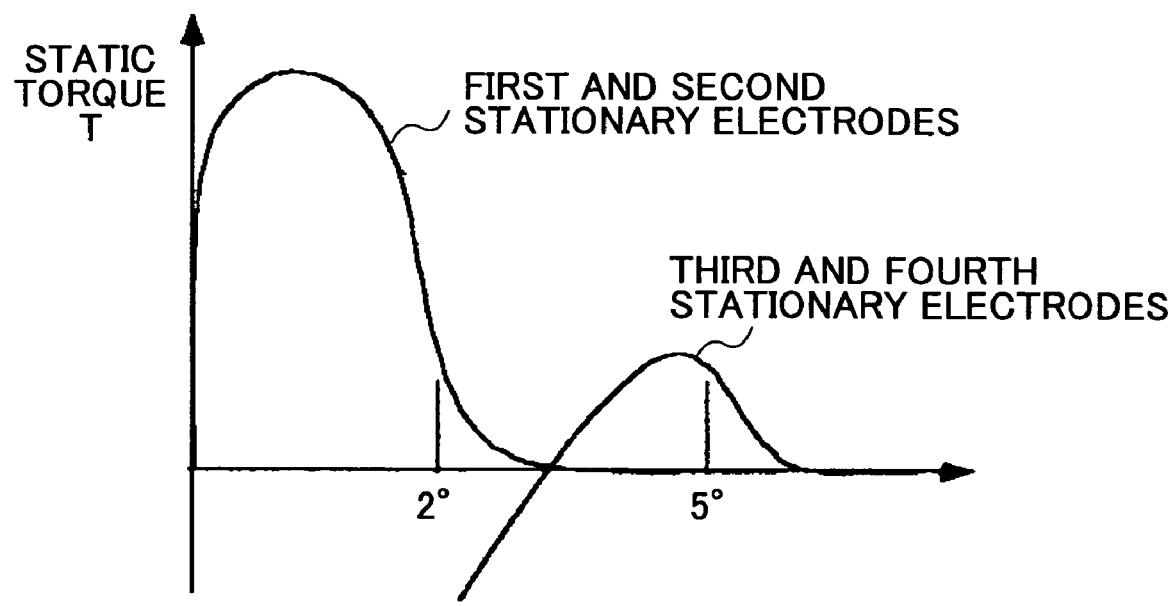
FIG. 10 is a graph showing a relation between the oscillation angle of a movable mirror and the static torque between electrodes of the micro mirror module.

FIG. 10 is a graph showing the static torque generated between the electrodes depending on the oscillation angle of the movable mirror 202.

Figure 11:
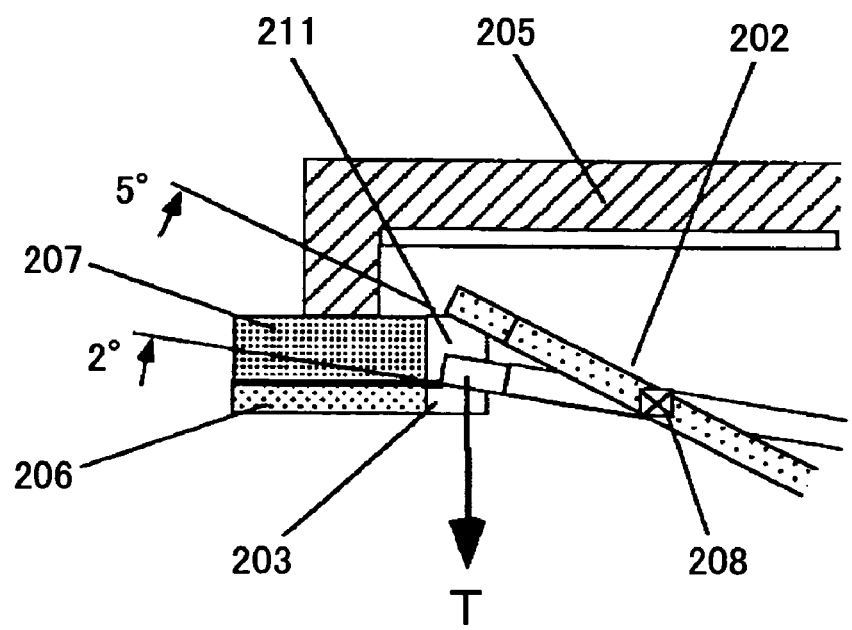
FIG. 11 is a cross-sectional view showing the electrodes of the micro mirror module.

FIG. 11 is a cross-sectional view of a portion of the oscillation mirror module. It is noted that in the present drawing, a static torque in a counterclockwise direction is denoted as a positive torque.

The movable mirror 202 is horizontally positioned at an initial state. When a voltage is applied to the third stationary electrode 211, static force in the negative direction is generated between the first movable electrode and the third stationary electrode 211 facing against each other. In turn, the torsion beam 208 is twisted and tilted to an oscillation angle counterpoised with the returning force of the torsion beam 208. When the application of the voltage is stopped, the movable mirror 202 returns back to its original horizontal position owing to the returning force of the torsion beam 208. In this case, the movable mirror 202 applies a voltage to the first and second stationary electrodes 203 and 204 before returning back to the horizontal position so that a static force in the positive direction is generated. Then, by applying a voltage to the fourth stationary electrode 212, the static force in the positive direction may be increased further. By alternatingly applying voltages to the stationary electrodes in the manner described above, the movable electrodes at the two sides of the movable mirror may oscillate back and forth past the first and second stationary electrodes 203 and 204, respectively, at an oscillation angle of approximately 2 degrees, for example.

In this case, the moment of inertia of the movable mirror 202 and the length and width of the torsion beam 208 are designed according to the desired drive frequency that corresponds to a frequency band of a first resonance mode using the torsion beam 208 as a rotational axis. In this way, the amplitude of the movable mirror 202 is increased through excitation so that the oscillation angle of the movable mirror 202 is increased to enable the movable electrodes provided at the sides of the movable mirror 202 to oscillate past the third and fourth stationary electrodes 211 and 212, respectively.

According to the present example, a static force for twisting the movable mirror in the positive direction is generated at the third stationary electrode 211 so that the oscillation angle range of the static torque may be increased, and a large oscillation angle may be secured even for a drive frequency that is outside the resonance frequency.

(Drive Frequency)

Figure 12:
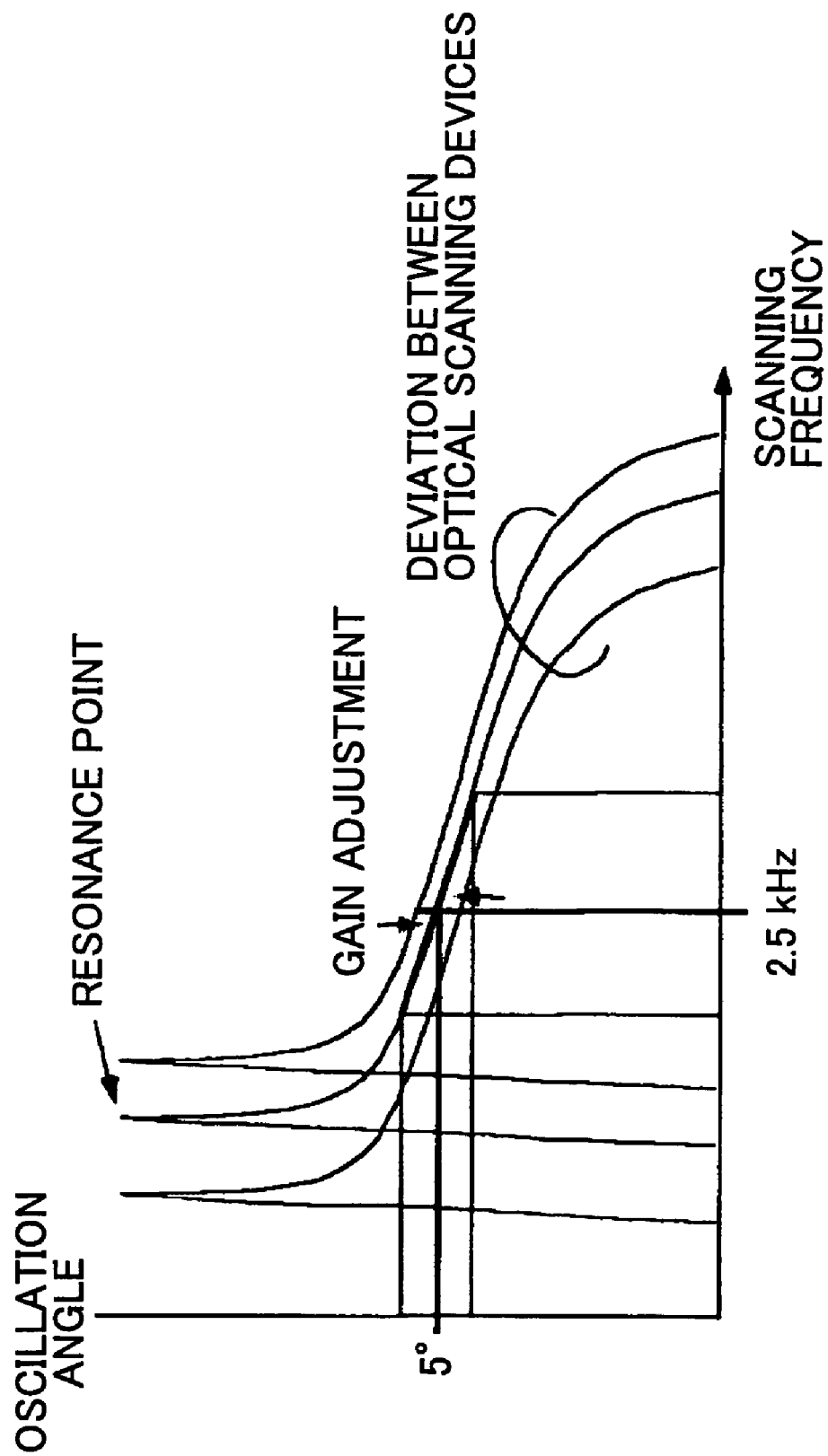
FIG. 12 is a graph showing a relation between the drive frequency and the oscillation angle of the movable mirror.

FIG. 12 is a graph illustrating the oscillation angle of the movable mirror in relation to the drive frequency. It is noted that although a maximum oscillation angle can be obtained when the drive frequency coincides with the resonance frequency, the oscillation angle tends to change precipitously around the resonance frequency.

Accordingly, although the drive frequency may initially be arranged to match the resonance frequency, this tends to create instability over time since the oscillation angle may be drastically reduced when the resonance frequency changes due to temperature change, for example. Also, it is noted that in a case where plural movable mirrors as used as is described below, variation occurs between the resonance frequency of each individual movable mirror so that the movable mirrors may not be driven by a common drive frequency.

In this regard, according to the present example, the drive frequency is set to a frequency band above the resonance frequency in the vicinity of the resonance frequency at which the oscillation angle fluctuation range is relatively small. Specifically, with respect to a resonance frequency of 2 kHz, the drive frequency is set to 2.5 kHz, and the oscillation angle of the movable mirror 202 is set to ±5 degrees by adjusting the gain of the applied voltage.

In this case, the drive frequency is preferably set to a frequency band that does not coincide with the resonance frequency even upon taking into account a variation in the resonance frequency due to mounting process errors of the oscillation mirror (e.g., 300 Hz) and the resonance frequency fluctuation due to temperature change (e.g., 3 Hz). For example, in a case where the resonance frequency is 2 kHz, the drive frequency is preferably set to a frequency band of at least 2.303 kHz or a frequency band of no more than 1.697 kHz.

Given that the length of the movable mirror is denoted as $2a$, its width as $2b$, its thickness as d, the length of the torsion beam as L, its width as c, the concentration of Si as $\rho$, the material constant as G, the moment of inertia as I, and the spring constant as K, then the resonance frequency f can be expresses as follows:

$$I = (4ab\rho d/3) \times a^2$$
$$K = (G/2L) \times [cd(c^2 + d^2)/12]$$
$$f = (1/2\pi) \times (K/I)^{1/2}$$
$$= (1/2\pi) \times [Gcd(c^2 + d^2)/24LI]^{1/2}$$

Also, it is noted that the length of the torsion beam L and the oscillation angle θ are proportional with respect to each other, and accordingly, their relation can be expressed as follows:

θ=A/If2 (A corresponding to a constant)

Further, it is noted that the oscillation angle θ is inversely proportional to the moment of inertia I. Thereby, in order to increase the resonance frequency f, the moment of inertia I has to be reduced, or otherwise the oscillation angle θ is reduced.

Accordingly, in the present example, the rear side of the movable mirror opposite the reflection surface is formed into a lattice structure in a manner such that the substrate thickness d is retained for the lattice portions while the recessed portions of the lattice structure are reduced to a thickness of d/10 through etching. In this way, the moment of inertia can be reduced by approximately ⅕. The parameters influencing the moment of inertia and design errors with respect to the dimensions of the torsion beam create variations in the resonance frequency.

Given that the dielectric constant of air is denoted as ε, the applied voltage as V, the distance between electrodes as δ, the static force between the electrodes as F, then the oscillation angle θ can be expressed as follows:

$$F=\epsilon HV^2/2\delta$$

θ=B×F/I (B corresponding to a constant)

It is noted that the oscillation angle θ increases in proportion to the increase of the length of the electrode H. By arranging the electrodes into comb-shaped structures, the drive torque can be increased by 2n times (n corresponding to the number of comb teeth of the comb-structure of the electrodes). By increasing the outer periphery dimensions of the electrodes to increase the electrode length in the manner described above, a large static torque can be obtained with a low voltage.

Given that the rotational speed of the movable mirror is denoted as υ, its area as E, and the air density as η, the viscosity resistance of air P can be expressed as follows:

$$P=C\times\eta\upsilon^2\times E^3$$

(C corresponding to a constant)

The viscosity resistance of air P works against the rotation of the movable mirror. Accordingly, the movable mirror is preferably covered and accommodated in a sealed vacuum space.

In the present example, a concave-shaped oscillation space is formed at a center portion of the oscillation mirror substrate, which is made of the first and second Si substrates 206 and 207 that are bonded together by an insulator film. The oscillation mirror substrate is mounted on the base substrate 220 having lead terminals 216 according to the bottom surface of the first Si substrate 206 in a manner such that the reflection surface of the oscillation mirror faces upward and the torsion beam 208 is positioned in alignment with a pair of V-shaped trenches formed at the outer rim of the substrate. A cover 205 made of transparent resin material, for example, is mounted on the upper surface of the second Si substrate 207 so that the oscillation space of the oscillation mirror 202 may be hermetically sealed. The oscillation space is provided with non-evaporating getters, and is arranged to have a pressure of no more than 1 torr upon being activated by heat from the outside. The optical beam is arranged to pass through the slit window 213 that is formed on the cover 205 to be incident to and irradiated from the oscillation mirror module.

(Optical Scanning Device)

Figure 13:
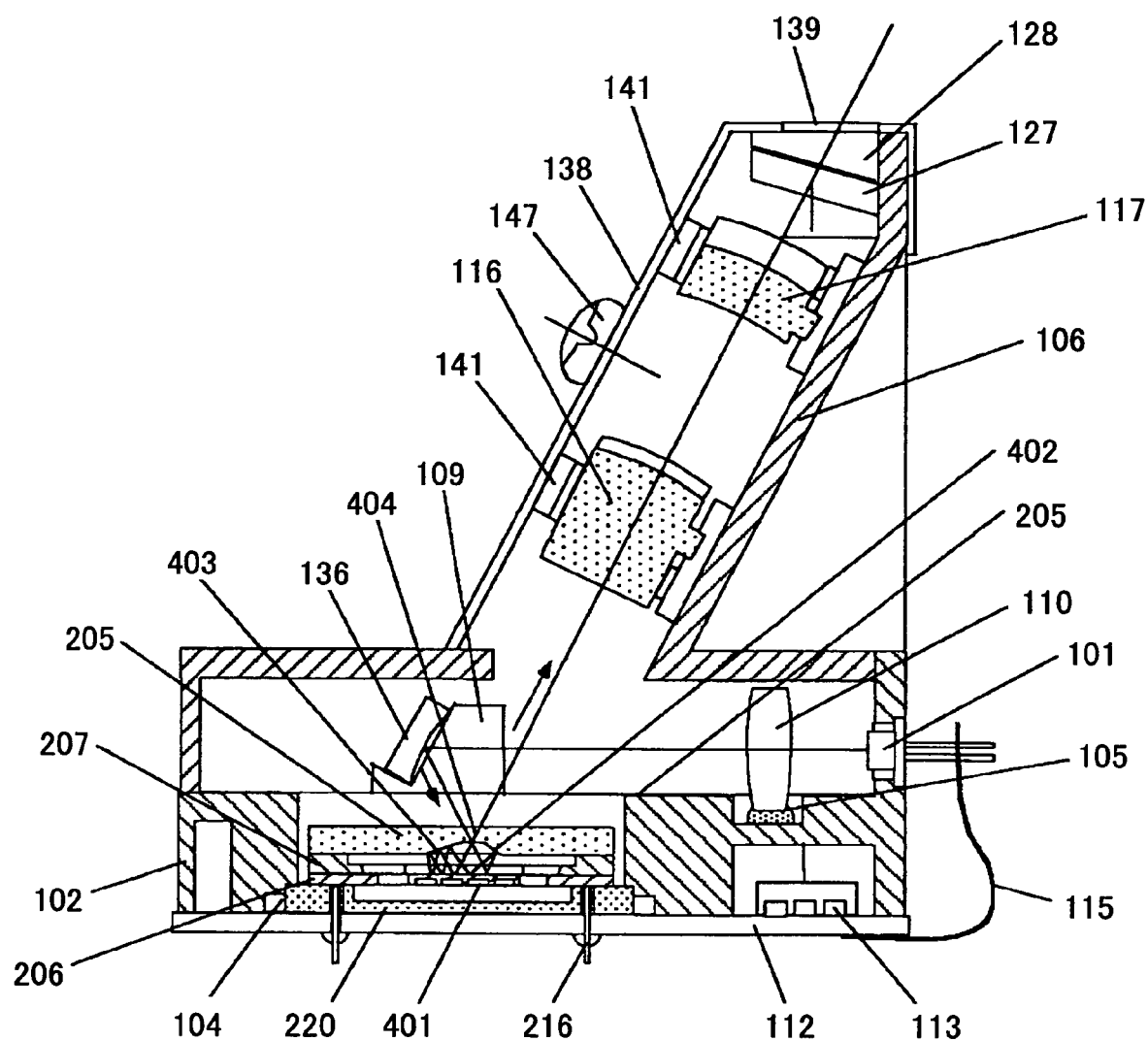
FIG. 13 is a cross-sectional view across a sub scanning direction of an optical scanning device according to an embodiment of the present invention.

FIG. 13 is a cross-sectional view across a sub scanning direction of an optical scanning device according to an embodiment of the present invention.

According to the present example, an optical beam irradiated from a semiconductor laser 101 passes through a coupling lens 110 and a cylinder mirror 136, to be incident to a movable mirror 401 via a slit window 404 in a direction that is tilted by approximately 20 degrees toward the sub scanning direction with respect to a normal line within a sub scanning cross-section plane including the torsion beam. Then, the optical beam reflected by the movable mirror 401 is incident to a first reflection surface 402 to be reflected back to the movable mirror 401. Then, the optical beam is reflected once more by the movable mirror 401 and passes through the slit window 404 to be incident to a second reflection surface 403. The optical beam is reflected back and forth three more times between the reflection surface and the movable mirror to move the reflecting position of the optical beam toward the sub scanning direction. According to the present example, the optical beam is reflected at the movable mirror 401 five times before being emitted outward from the slit window.

By arranging the optical beam to be reflected a plural number of times, a large scanning angle may be obtained even when the oscillation angle of the movable mirror is small to thereby reduce the light path length.

In this case, given that the total number of reflections at the movable mirror is denoted as N, and the oscillation angle is denoted as α, the scanning angle θ can be expressed as 2Nα.

In the illustrated example, N=5, and α=5, and thereby, a maximum scanning of 50° is obtained and the image recording region is set to 35°. It is noted that resonance is suitably used to reduce the required voltage and heat generation. However, as can be appreciated from the above formulas, as the recording speed (i.e., the resonance frequency) is increased, the spring constant K of the torsion beam has to be increased as well. In such case, a sufficient oscillation angle may not be obtained. Accordingly, in the present example, a counter mirror is provided in order to enlarge the scanning angle and to secure a sufficient scanning angle regardless of the recording speed.

By arranging the counter mirror to have reflection surfaces that are inclined with respect to each other, and alternating the incident angle of the reflected optical beam between positive and negative directions, that is, switching the direction of the reflected light between left and right, deflection of the scanning line at a scanned surface due to the inclined incidence of light may be prevented so that linearity may be maintained, and the rotation of light flux within a plane that is orthogonal to the optical axis may be reverted back to its original state upon being irradiated from the movable mirror module so that degradation of image formation characteristics may be prevented.

Figure 14:
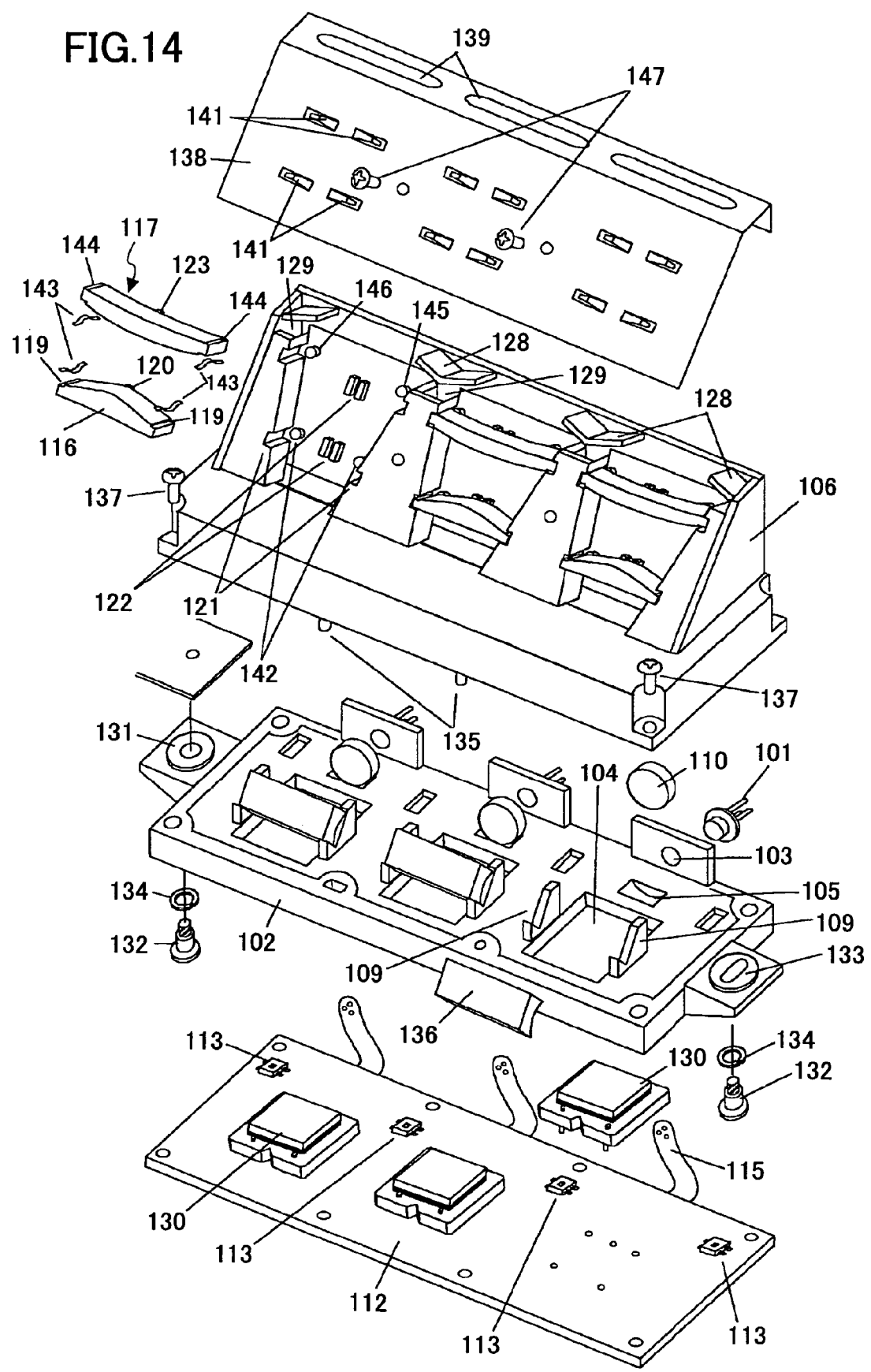
FIG. 14 is an exploded perspective view of an optical scanning device according to an embodiment of the present invention.
Figure 15:
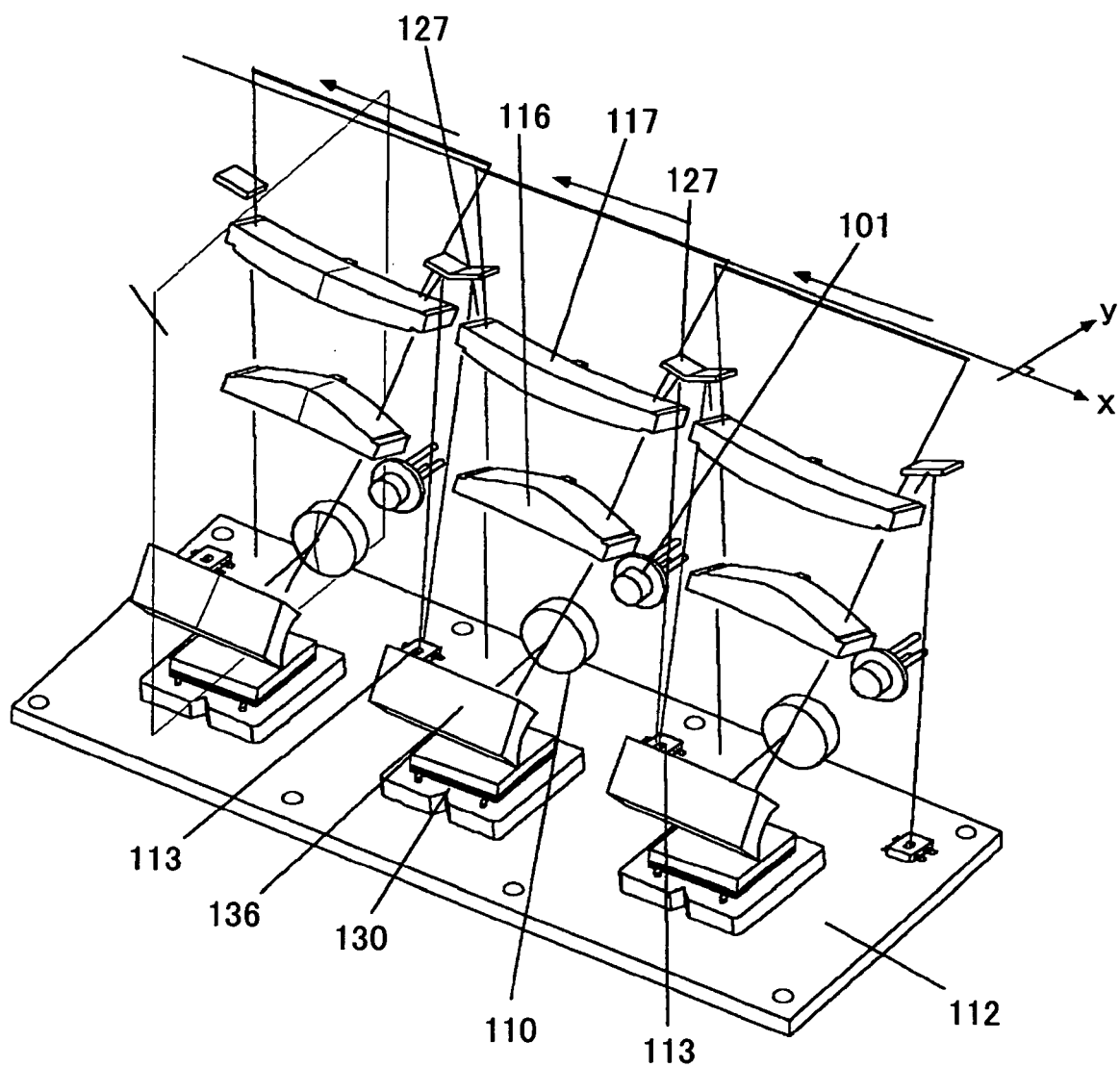
FIG. 15 is a perspective view showing the positioning of optical elements of the optical scanning device of FIG. 14.

FIG. 14 is an exploded perspective view of an optical scanning device according to an embodiment of the present invention. FIG. 15 is a diagram illustrating an exemplary positioning of optical elements according to an embodiment of the present invention.

Referring to FIG. 14, a semiconductor laser 101 corresponding to a light source is press fit into a tiered through hole 103 that is provided at a wall placed on a frame member 102. The semiconductor laser 101 is press fit into the through hole 103 according to the step periphery of the semiconductor laser 101, and the optical axis direction is adjusted by pressing a protruding surface of the stem to a stepped portion of the through hole 103. A coupling lens 110 is accommodated into a U-shaped concave portion 105 and fixed therein via a UV adhesive material. The optical axis direction of the coupling lens with respect to the light emitting point is adjusted by positioning the coupling lens 110 within the U-shaped concave portion 105 in a manner such that the optical axis of the coupling lens 110 coincides with the irradiation axis of light irradiated from the semiconductor laser 101 and the irradiated light flux corresponds to a parallel light flux. Then, the UV adhesive material between the concave portion 105 and the coupling lens 110 is hardened so that their relative positioning is fixed. It is noted that in the illustrated example, three light source elements having the configuration as is described above are provided.

The optical beam irradiated from the coupling lens 110 is incident to a cylinder mirror 136 that is supported by a pair of slanted engaging surfaces, the cylinder mirror 136 having a negative curvature in the sub scanning direction. Then, the optical beam is incident to an oscillation mirror module 130 through a slit window to be condensed at the movable mirror surface as a condensed light flux in the sub scanning direction.

The positioning of the oscillation mirror module 130 is arranged such that the torsion beam direction coincides with the optical axis direction. Specifically, the position of the oscillation mirror module 130 is adjusted by positioning the bottom side of the tiered hole 104 formed at the bottom surface of the frame member 102 on a printed circuit board 112 according to the structure of the outer periphery of the printed circuit board 112, and the position of the movable mirror surface is adjusted by pressing the protruding surface to the stepped portion as is described above. In the illustrated example, three oscillation mirror modules 130 are positioned equidistant from each other by a single frame member 102.

The oscillation mirror module 130 is mounted on the printed circuit board 112 by inserting lead terminals 216 protruding from the bottom side of the base substrate 220 into through holes of the printed circuit board 112 and soldering the lead terminals thereto so that the oscillation mirror module 130 comes into contact with the upper surface of the printed circuit board 112 to seal the opening formed at the bottom side of the frame member 102 while realizing circuit connection.

The printed circuit board 112 includes electronic parts for realizing drive circuits for the semiconductor lasers 101 and drive circuits for the movable mirrors, and synchronization detection sensors 113. In the printed circuit board 112, connection with external circuits is collectively realized by wiring. Cables 115 connected to one side of the printed circuit board 112 are connected to the respective lead terminals of the semiconductor lasers 101.

The frame member 102 is arranged to have a certain amount of rigidity and may be made of glass fiber strengthened resin or aluminum die cast, for example. The frame member 102 has flange portions 131 and 133 formed at its sides to realize engagement with an imaging apparatus main body, for example. The flange portion 131 has a reference hole into which an axial portion of a fixing screw 132 is engaged via a spring washer 134. The flange 133 at the other side has a long hole through which a fixing screw 132 is inserted via a spring washer 134 to be positioned against a photoconductor.

In the present example, a scan line generated on a scanned surface (photoconductor) by one of the oscillation mirror modules 130 is adjusted to be parallel with the direction X shown in FIG. 15 (main scanning direction) that is perpendicular to the moving direction Y of the scanned surface (sub scanning direction) using the backlash of the reference hole as the rotational axis.

The upper surface of the frame member 102 is arranged to be parallel with a surface orthogonal to the mirror normal direction of the oscillation mirror modules provided at the bottom side of the holes 104. Two protrusions 135 (see FIG. 14) protruding from a bottom surface of a housing 106 are inserted into engaging holes provided on the frame member 102 to adjust their relative positioning, after which the housing 106 and the frame member 102 are fixed together by screws 137. In the present example, the screws 137 are engaged to the printed circuit board 112 via through holes provided at the frame member 102 so that the housing 106, the frame member 102, and the printed circuit board 112 are connected to form an integral structure after which soldering as is described above is conducted.

The housing 106 includes a first scanning lens 116 and a second scanning lens 117 for realizing image formation. The scanning lenses 116 and 117 are aligned in the main scanning direction, and their positioning is adjusted such that their respective scanning regions slightly overlap with one another. The scanning lenses 116 and 117 are integrally supported within the housing 106.

The first scanning lens 116 includes a protrusion 120 provided at the center of a sub scanning direction reference plane for adjusting its position in the main scanning direction, and pressed surfaces 119 provided at side portions of the first scanning lens 116 for adjusting its position in the optical axis direction. The protrusion 120 is engaged into a trench 122 that is integrally formed at the housing 106, and the pressed surfaces 119 are respectively inserted into cuts 121 formed at the housing 106 and held down toward the light entrance surface side by corrugated plate springs 143. In this way adjustment of the relative positioning of scanning lenses arranged on the same plane that is orthogonal to the optical axis is realized. The sub scanning direction reference plane is arranged to come into contact with the tips of a pair of protrusions 142 protruding from the housing 106 so that positioning of the first scanning lens 116 within the plane orthogonal to the optical axis and the height of the first scanning lens 116 may be set. The scanning lens 116 is supported by plate springs 141 that are integrally formed at a cover 138.

Similarly, the second scanning lens 117 includes a protrusion 123 provided at the center of a sub scanning direction reference plane for adjusting the position of the second scanning lens 117 with respect to the main scanning direction, and pressed surfaces 144 provided at the two sides of the second scanning lens 117 for adjusting its position with respect to the optical axis direction. The protrusion 123 is engaged into a trench 122 that is integrally formed at the housing 106, and the pressed surfaces 144 are inserted into cuttings 121 with the corrugated plate spring 143 holding the pressed surfaces 144 to the light exit side. The sub scanning direction reference plane is placed into contact with the tips of a protrusion 145 protruding from the housing and an adjustment screw 146 that can be pushed in and pulled out with respect to the sub scanning direction. In this way the height of the second scanning lens 117 is adjustably set and supported by plate springs 141 that are integrally formed at the cover 138. It is noted that the cover 138 is fixed to the housing 106 by screws 147.

It is noted that in the vicinity of the second scanning lens 117, mirrors 127 and 128 are provided for reflecting the optical beam to the synchronization detection sensor 113 to realize main scanning synchronization detection. It is also noted that in the illustrated example, three optical scanning devices are integrally provided. However, the present invention is not limited to such an example, and any number of optical scanning devices may be implemented.

(Laser Printer)

Figure 16:
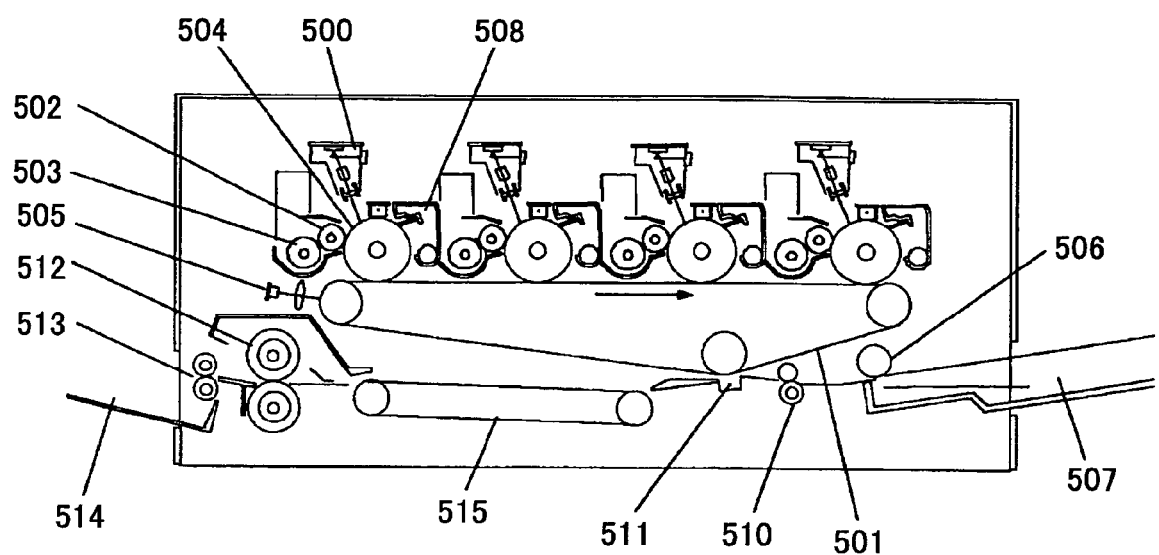
FIG. 16 is a cross-sectional view showing an exemplary configuration of a laser printer that uses an optical scanning device according to an embodiment of the present invention.

FIG. 16 is a diagram showing an exemplary structure of a tandem type color laser printer that uses four optical scanning devices 500 that are each arranged to form images in one of four different colors on corresponding photoconductor drums 504, the respective images formed by the optical scanning devices 500 being superposed on top of each other by the rotation of a transfer belt 501. In this illustrated example, the irradiating direction of the optical beam is arranged to be in a downward direction.

The transfer belt 501 is supported by a drive roller and two driven rollers. The photoconductor drums 504 are aligned along the moving direction of the transfer belt 501 and spaced apart by equal distances. It is noted that in the vicinity of the photoconductor drums 504, developing rollers 502 and toner hopper units 503 are provided for supplying toner corresponding to the colors yellow, magenta, cyan, and black, respectively, and cleaning units 508 are provided for removing and cleaning residual toner from the respective photoconductors 504 with a blade after the images are transferred.

According to the present example, latent images are formed at the respective optical scanner devices 500 through shifting the write timing in the sub scanning direction according to a trigger signal from a sensor 505 that detects a resist mark formed at the edge of the transfer belt 501. Then, corresponding toner images are formed at the developing units 502, after which the images are successively transferred onto the transfer belt 501.

A paper sheet is supplied from a paper feeding tray 507 via a paper feeding roller 506, and the sheet is fed to a transfer unit 511 at a timing corresponding to the image formation timing of the fourth color image. At the transfer unit 511, the four color images are simultaneously transferred to the sheet from the transfer belt. The sheet with the toner image transferred thereon is delivered to a fixing unit by a delivery belt 515. The transferred toner image is fixed by a fixing roller 512 after which the paper with the fixed toner image is delivered to a paper delivery tray 514.

It is noted that embodiments of the present invention may be applied to imaging apparatuses such as digital copiers and laser printers, optical scanning bar code readers, laser radar apparatuses for vehicles, and other various apparatuses using optical scanning technology.

In the following, features and advantages of embodiments of the present invention are described.

According to an embodiment of the present invention, an optical scanning device including a base substrate with lead terminals, an oscillation mirror substrate, and a transparent substrate may be constructed through simple mounting procedures using a small number of components so that miniaturization and cost reduction of the optical scanning device may be realized. Also, by sealing the oscillation space of the oscillation mirror at a surface on which external electrodes are formed, a reliable hermetic seal may be realized and the external electrodes may be derived outside the hermetically sealed space at the same time.

According to an embodiment of the present invention, by integrating plural external electrodes on one side of the oscillation mirror substrate, electrical connection with the base substrate may be realized via the lead terminals in a cost efficient manner and a hermetic seal may be easily realized.

According to an embodiment of the invention, instead of realizing electrical connection with the base substrate via the lead terminals through wire bonding, direct connection may be realized using solder balls, for example, so that the mounting procedures may be further simplified and miniaturization of the optical scanning device structure may be realized.

According to an embodiment of the present invention, by forming conduction holes around the external electrodes and applying a conductive material therein to achieve conduction between the external electrodes and the drive electrodes of the optical scanning device, the external electrodes may be protected from shorting defects with adjacent electrodes so that reliable conduction may be realized.

According to an embodiment of the present invention, the oscillation mirror substrate and the base substrate are arranged to be easily positioned with respect to each other so that a suitable connection may be realized between the substrates.

According to an embodiment of the present invention, the oscillation mirror substrate is used to realize electrodes of the oscillation mirror so that the electrodes may be easily formed compared to a case in which a metal film is formed to realize the electrodes. Also, by using a conductor as the oscillation mirror substrate, external electrodes for deriving wiring to the outside may be readily formed at any location.

According to an embodiment of the present invention, isolation between the electrodes may be effectively realized by the slit trenches that are connected to the oscillation space of the oscillation mirror, and a reliable hermetic seal of the oscillation space may be effectively realized by implementing getters (gas adsorbing material) in the slit trenches so that a desired vacuum/hermetic sealed space may be realized and maintained.

According to an embodiment of the present invention, by realizing a hermetic seal, influences of the usage environment such as temperature and humidity may be blocked so that operations reliability may be improved, and dynamic deformation of the oscillation mirror during operation may be reduced. Also, by realizing a vacuum seal, influences of viscosity resistance of air and may be blocked so that dynamic deformation of the oscillation mirror may be further reduced and a large oscillation angle may be obtained.

According to an embodiment of the present invention, an optical beam is arranged to be reflected back and forth between the oscillation mirror and the counter mirror so that the scanning angle may be increased.

According to an embodiment of the present invention, a small number of components and a small number of mounting processes are used in forming the optical scanning device so that the manufacturing cost may be reduced.

According to an embodiment of the present invention, the oscillation mirror substrate including electrodes of the oscillation mirror and the counter mirror substrate are connected before realizing connection with the base substrate so that the oscillation mirror and the counter mirror may be accurately positioned with respect to each other. Also, according to an embodiment, mounting processes up to connection with the base substrate is arranged to be simple and inexpensive while also being adaptable to miniaturization of the optical scanning device structure.

According to an embodiment of the present invention, the relative positioning between the oscillation mirror and the counter mirror can be accurately adjusted so that optical characteristics of the optical scanning device may be improved.

According to an embodiment of the present invention, the oscillation mirror is driven by a drive voltage having a frequency band that is outside the resonance peak of the oscillation mirror, and thereby, the adjustment range of the drive frequency may be widened.

According to an embodiment of the present invention, the optical scanning device of the present invention is used in an imaging apparatus so that power consumption and noise may be reduced compared to a case of using a conventional polygon mirror.

According to an embodiment of the present invention, a hermetically sealed optical scanning device that is mounted on a base substrate having a drive circuit formed thereon is manufactured through simple and inexpensive mounting procedures using a small number of components.

Further, it is noted that the present invention is not limited to the specific embodiments described above, and variations and modifications may be made without departing from the scope of the present invention.

The present application is based on and claims the benefit of the earlier filing date of Japanese Patent Application No. 2004-068028 filed on Mar. 10, 2004, the entire contents of which are hereby incorporated by reference.

What is claimed is:

1. An optical scanning device, comprising:
   a plurality of drive electrodes formed on a substrate of an oscillation mirror for driving the oscillation mirror, the drive electrodes being arranged in perpendicular and parallel directions with respect to a torsion rotational axis; and
   a plurality of external electrodes of the drive electrodes that are formed on the substrate at a same height and a same side,
   wherein the external electrodes are integrally formed on a side of the substrate of the oscillation mirror against which side a base substrate including a lead terminal is positioned.

2. An optical scanning apparatus comprising:
   an optical scanning device including
      a plurality of drive electrodes formed on a substrate of an oscillation mirror for driving the oscillation mirror, the drive electrodes being arranged in perpendicular and parallel directions with respect to a torsion rotational axis; and
      a plurality of external electrodes of the drive electrodes that are formed on the substrate at a same height and a same side,
      wherein the external electrodes are integrally formed on a side of the substrate of the oscillation mirror against which side a base substrate including a lead terminal is positioned; and
   a drive voltage generating device that generates a voltage of a predetermined frequency and applies the generated voltage to the optical scanning device to drive the oscillation mirror, the predetermined frequency corresponding to a frequency band in the vicinity of a resonance frequency of the oscillation mirror and outside a peak range of the resonance frequency.

3. An imaging apparatus comprising:
   an optical scanning device including
      a plurality of drive electrodes formed on a substrate of an oscillation mirror for driving the oscillation mirror, the drive electrodes being arranged in perpendicular and parallel directions with respect to a torsion rotational axis; and
      a plurality of external electrodes of the drive electrodes that are formed on the substrate at a same height and a same side,
      wherein the external electrodes are integrally formed on a side of the substrate of the oscillation mirror against which side a base substrate including a lead terminal is positioned;
   a photoconductor on which an electrostatic image is formed by the optical scanning device;
   a developing unit that develops a toner image based on the electrostatic image; and
   a transfer unit that transfers the toner image onto a recording medium.

4. The optical scanning device as claimed in claim 1, further comprising:
   conduction holes formed around the external electrodes, the conduction holes being used to realize conduction between the external electrodes and the drive electrodes in a case where the external electrodes are formed at an opposite side of the drive electrodes.

5. The optical scanning device as claimed in claim 1, wherein the external electrodes are substantially equivalent in size and are arranged to be substantially symmetrical with respect to a center of the substrate of the oscillation mirror.

6. The optical scanning device as claimed in claim 1, wherein the oscillation mirror is formed on the substrate of the oscillation mirror, the substrate of the oscillation mirror including a conductor that functions as the drive electrodes of the oscillation mirror.

7. The optical scanning device as claimed in claim 6, further comprising:
   an oscillation space of the oscillation mirror; and
   slit trenches formed at the substrate of the oscillation mirror and connected to the oscillation space;
   wherein the external electrodes of the drive electrodes are formed on the substrate of the oscillation mirror and spatially isolated by the slit trenches.

8. The optical scanning device as claimed in claim 1, further comprising:
   an oscillation space of the oscillation mirror that is hermetically sealed.

9. The optical scanning device as claimed in claim 1, further comprising:
   a counter mirror that is positioned against the oscillation mirror and spaced apart from the oscillation mirror by an oscillation space of the oscillation mirror;
   wherein an optical beam is reflected between the oscillation mirror and the counter mirror.

10. The optical scanning device as claimed in claim 9, wherein the counter mirror is integrally formed on a substrate that is used to hermetically seal the oscillation space.

11. The optical scanning device as claimed in claim 10, wherein the substrate of the counter mirror is directly connected to the substrate of the oscillation mirror.

12. The optical scanning device as claimed in claim 11, wherein the substrate of the oscillation mirror includes one or more positioning indicators for adjusting a positioning between the oscillation mirror and the counter mirror.

13. A method of manufacturing an optical scanning device that includes an oscillation mirror formed on a substrate of the oscillation mirror as an optical beam deflector, the method comprising a step of:
   forming a plurality of external electrodes of a plurality of drive electrodes of the oscillation mirror on the substrate at a same height and on a same side,
   wherein the external electrodes are integrally formed on a side of the substrate of the oscillation mirror against which side a base substrate including a lead terminal is positioned.

14. The method of manufacturing an optical scanning device as claimed in claim 13, wherein the external electrodes of the drive electrodes are formed on a side of the substrate of the oscillation mirror against which side a base substrate including a lead terminal is positioned.

15. The method of manufacturing an optical scanning device as claimed in claim 14, further comprising the steps of:
   forming conduction holes around the external electrodes of the drive electrodes; and
   realizing conduction between the drive electrodes and the external electrodes through the conduction holes.

16. The method of manufacturing an optical scanning device as claimed in claim 13, wherein the oscillation mirror is formed on the substrate of the oscillation mirror, the substrate of the oscillation mirror including a conductor.

17. The method of manufacturing an optical scanning device as claimed in claim 13, wherein the external electrodes of the drive electrodes are arranged to be substantially symmetrical with respect to a center of the substrate of the oscillation mirror.

18. The method of manufacturing an optical scanning device as claimed in claim 17, further comprising the steps of:
   forming slit trenches at the substrate of the oscillation mirror, the slit trenches being connected to an oscillation space of the oscillation mirror; and
   spatially isolating the external electrodes of the drive electrodes by the slit trenches.

19. The method of manufacturing an optical scanning device as claimed in claim 13, further comprising a step of:
   hermetically sealing an oscillation space of the oscillation mirror.

20. The method of manufacturing an optical scanning device as claimed in claim 13, further comprising a step of:
   positioning a counter mirror against the oscillation mirror, the counter mirror being spaced apart from the oscillation mirror via an oscillation space of the oscillation mirror.

21. The method of manufacturing an optical scanning device as claimed in claim 20, wherein the counter mirror is integrally formed on a substrate that is used to hermetically seal the oscillation space of the oscillation mirror.

22. The method of manufacturing an optical scanning device as claimed in claim 21, further comprising a step of:
   directly connecting the substrate of the counter mirror to the substrate of the oscillation mirror.

23. The method of manufacturing an optical scanning device as claimed in claim 22, further comprising a step of:
   forming one or more indication marks on the substrate of the oscillation mirror through etching, the marks indicating a relative positioning between the oscillation mirror and the counter mirror.

* * * * *